Figure 1:
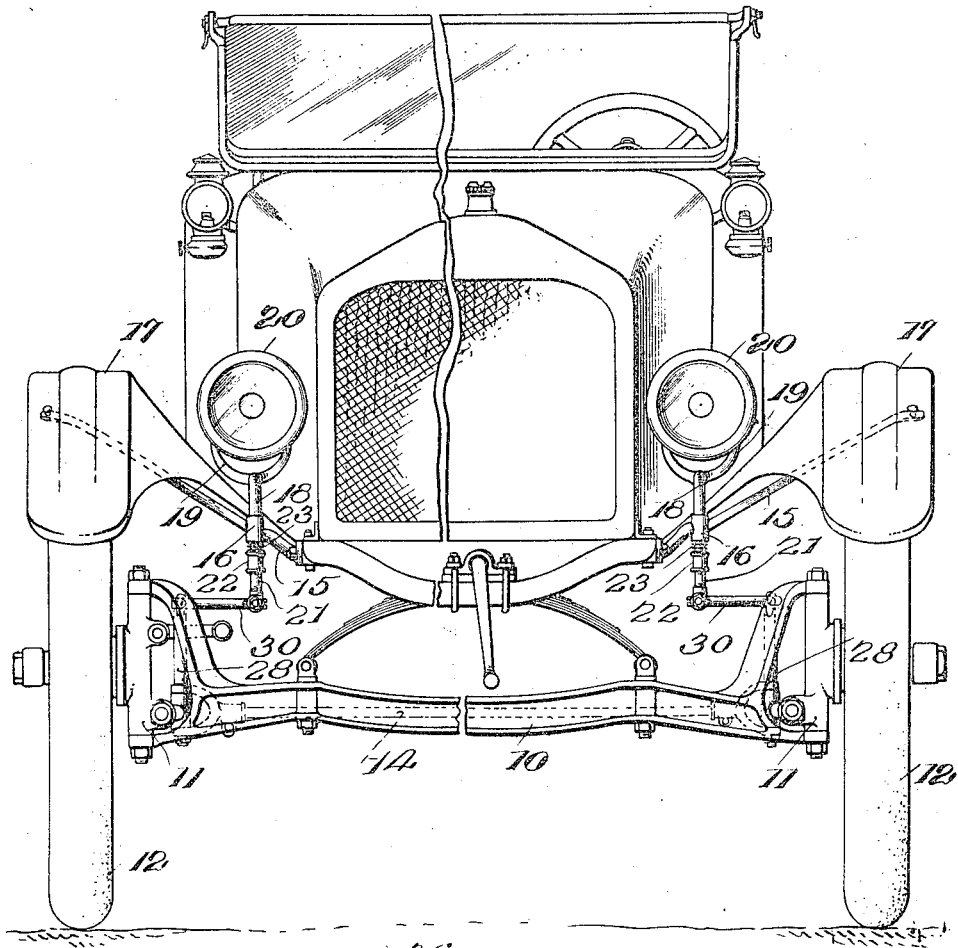

W. H. SHANNON & J. H. BOGARD.
HEADLIGHT STEERING MECHANISM.
APPLICATION FILED AUG. 2, 1917.

1,272,542.

Patented July 16, 1918.
2 SHEETS—SHEET 1.

Inventors
W. H. Shannon
J. H. Bogard
By
Attorneys

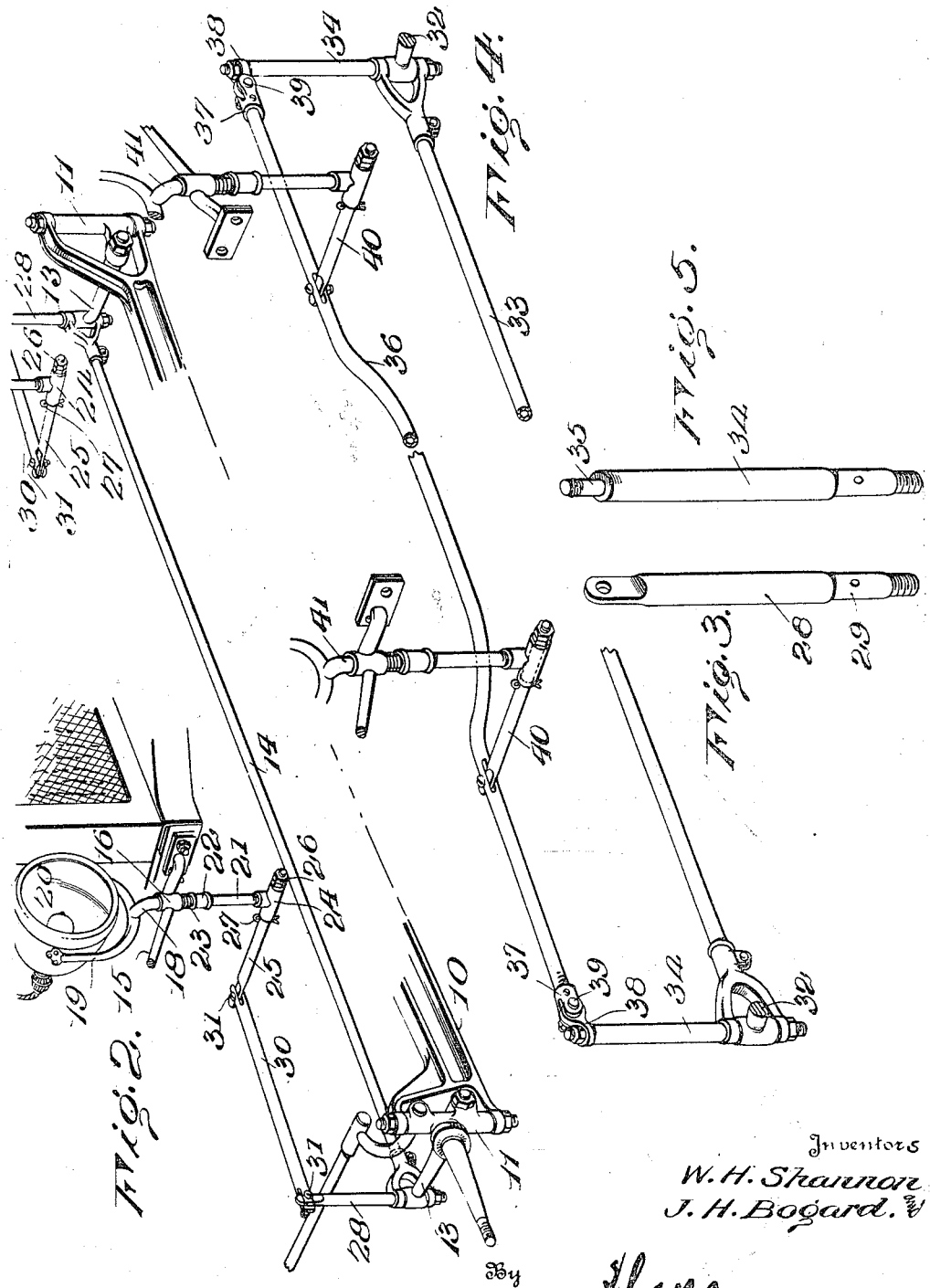

UNITED STATES PATENT OFFICE.

WILLIAM H. SHANNON AND JOHN H. BOGARD, OF SAN SABA, TEXAS.

HEADLIGHT-STEERING MECHANISM.

1,272,542.  Specification of Letters Patent. Patented July 16, 1918.

Application filed August 2, 1917. Serial No. 184,100.

*To all whom it may concern:*

Be it known that we, WILLIAM H. SHANNON and JOHN H. BOGARD, citizens of the United States, residing at San Saba, in the county of San Saba and State of Texas, have invented certain new and useful Improvements in Headlight-Steering Mechanisms, of which the following is a specification.

This invention relates to an improved steering mechanism for motor vehicles and has as its primary object to provide a simple and at the same time thoroughly efficient construction for turning the headlights of the vehicle so that the rays from the said lights will be directed in the path of the vehicle as the vehicle is guided.

The invention has as a further object to provide a construction wherein the headlights will be connected with the arms of the steering knuckles of the vehicle to be rotated by the said arms as they are swung to guide the vehicle.

And the invention has as a still further object to provide an arrangement wherein the posts employed in the steering mechanism to connect the said mechanism with the arms of the steering knuckles of the vehicle will also serve to connect the reach rod of the vehicle steering mechanism with the said arms.

Figure 6:
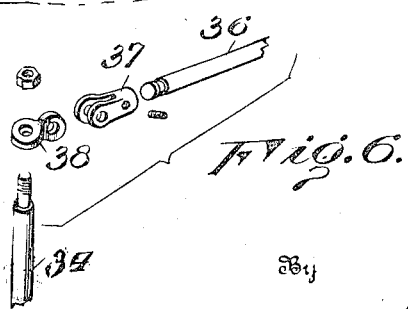

Other and incidental objects will appear as the description proceeds and in the drawings wherein we have illustrated the preferred embodiment of the invention and wherein similar reference characters designate corresponding parts throughout the several views:

Figure 1 is a front elevation showing our improved steering mechanism applied to a conventional type of motor vehicle, Fig. 2 is a fragmentary perspective view on an enlarged scale particularly illustrating the manner in which the steering mechanism is connected with the arms of the steering knuckles of the vehicle, Fig. 3 is a detail view showing the type of post employed for connecting the headlight steering mechanism with the steering mechanism of the vehicle, Fig. 4 is a fragmentary perspective view showing a slightly modified form of the invention, Fig. 5 is a detail view showing the type of post employed for connecting the modified form of headlight steering mechanism with the steering mechanism of the vehicle, and Fig. 6 is a fragmentary perspective view illustrating the type of connection employed in the modified form of the invention between the pivot posts and the actuating rod of the mechanism.

Referring more particularly to the drawings, we have shown our improved headlight steering mechanism in connection with a conventional type of motor vehicle having a front axle 10 at the ends of which are arranged steering knuckles 11 supporting the front wheels 12 of the vehicle. Extending rearwardly from the steering knuckles are arms 13 between which is arranged a reach or connecting rod 14. Connected to opposite sides of the vehicle chassis adjacent the forward end thereof are upwardly extending fender brackets 15 provided adjacent their inner extremities with lamp sockets 16. At their outer ends, the said brackets support the front fenders 17 of the vehicle.

Rotatably fitted through the lamp sockets 16 are lamp supporting posts 18 provided at their upper extremities with forks 19 receiving the lamps or headlights 20 connected in any approved manner with the said forks. The headlights may be of any preferred type. Secured to the lower ends of the posts 18 to extend downwardly therefrom are rods 21 detachably connected with the said posts by sleeves 22. Interposed between the lamp sockets 16 and the said sleeves are helical springs 23 surrounding the lower extremities of the posts 18 and yieldably holding the said posts seated within the sockets 16 to overcome any tendency toward upward shifting of the headlights. Screw threaded upon the lower extremities of the rods 21 are T-couplings 24 and loosely fitted through the horizontal portions of the said couplings are arms 25. The outer ends of these arms are screw threaded to receive superposed nuts 26 connecting the said arms with the couplings and fitted through the arms in the rear of the couplings are cotter pins or other similar elements 27 adapted to hold the arms against longitudinal movement through the couplings.

It is now to be observed that the reach rod 14 of the vehicle is, as usual, formed at its ends with suitable forks each of which embraces a journal at the outer end of one of the steering knuckle arms 13. The bolts commonly employed to connect the said forks with the arms are displaced and in lieu thereof, the pivot posts 28 of our improved mechanism are substituted. These posts are, at their lower extremities, reduced, as shown in detail in Fig. 3 of the drawings, to provide trunnions 29 fitting through the said fork arms and journals and pivotally connecting the reach rod with the said arms. At their lower ends, the posts 28 are screw threaded to receive superposed nuts securing the said posts in position. Extending between the upper ends of the posts 28 and the rear extremities of the arms 25 are actuating rods 30. The rods 30 are bifurcated at the extremities thereof while the posts 28 as well as the arms 25 are formed with flattened portions to receive the bifurcated terminals of the said rods. Pivotally connecting the rods with the posts and with the arms, are bolts or other suitable fastening devices 31.

It will now be clear from the preceding description that when the arms 13 of the steering knuckles are swung to guide the front wheels 12 of the vehicle, the pivot posts 28 of our improved mechanism will be swung with the said arms to correspondingly rotate the lamp posts 18 and headlights 20. Thus, the headlights will be directed in the path of the vehicle as the vehicle is guided. In this connection, attention is directed to the fact that the pivotal connection between the pivot posts 21 and the actuating rods 30 will compensate for any movement of the body of the vehicle tending to shift the headlights vertically relative to the said posts while the pivotal connections between the actuating rods and the arms 25 will compensate for the arcuate movement of the pivot posts with the arms 13 of the steering knuckles. Furthermore, it is to be particularly noted that the arms 25 are rotatably connected with the T-couplings 24 so that these arms may rotate to also compensate for any vertical movement of the vehicle body and consequently prevent binding of the rods 30 upon the arms 25 at the joint therebetween. We therefore provide an arrangement wherein the several elements of the mechanism will at all times be free to properly coact for guiding the headlights of the vehicle from the vehicle steering mechanism and a construction which, while being exceedingly simple, will at all times operate in a thoroughly efficient manner.

In Figs. 4, 5 and 6 of the drawings we have illustrated a slight modification of the invention. In this modification, the arms from the steering knuckles of the vehicle are indicated at 32 and extending between these arms is a reach rod 33. Connecting the rod with the said arms are upstanding pivot posts 34, one of which is shown in detail in Fig. 5 of the drawings. These posts correspond to the posts 28 of the preferred form of the invention and at their upper extremities are provided with reduced trunnions 35. Extending between the upper extremities of the said posts is an actuating rod 36 equipped at its ends with bifurcated coupling members 37. Connecting the rod 36 with the pivot posts are links 38. As shown in detail in Fig. 6 of the drawings, these links are mounted to swing horizontally upon the trunnions 35 of the said posts and are formed with right-angled portions fitting between the arms of the forked coupling members 37. The upper terminals of the posts are screw threaded to receive nuts securing the said links in position while the links are connected with the coupling members by bolts or other suitable fastening devices 39. This provides an arrangement whereby the links may swing upon the pivot posts 34 while at the same time the actuating rod 36 may swing vertically upon the said links. Pivotally connected in any approved manner with the actuating rod 36 at longitudinal spaced points thereon, are arms 40 projecting forwardly from the said rod and connected, as in the preferred form of the invention, with the lamp receiving posts 41 which are mounted as previously described. Thus, when the arms 32 of the steering knuckles are swung to guide the vehicle, the posts 41 will be correspondingly rotated to direct the headlights in the path of the vehicle. In some instances it may be found desirable to use this modified construction and it will be seen that the arrangement is such as to provide a thoroughly efficient device.

Having thus described the invention, what is claimed as new is:

1. The combination with a vehicle having a steering mechanism including a steering knuckle arm provided with a sleeve, and a reach rod provided with a yoke receiving the sleeve between the arms of the yoke, of a headlight steering mechanism for the vehicle including a rotatable lamp receiving post, a post fitted through said yoke, arms and sleeve and pivotally connecting the steering knuckle arm and rod, and coacting pivotally connected rods one rotatably connected with the lower end of the lamp receiving post and the other pivotally connected with the upper end of said last mentioned post and forming an operative connection between the said posts for rotating the lamp receiving post as the vehicle is steered.

2. The combination with a vehicle having a steering mechanism including a steering knuckle arm provided with a sleeve, and a reach rod provided with a yoke receiving said sleeve between the arms of the yoke, of a headlight steering mechanism for the vehicle including a rotatable lamp receiving post, a coupling fixed upon the lower end of said post, a second post reduced at its lower extremity and having the reduced portion thereof fitted through said yoke arms and sleeve and pivotally connecting the steering knuckle arm and reach rod, and coacting pivotally connected rods one rotatably fitted through said coupling and the other pivotally connected with the upper end of the said second mentioned post and forming an operative connection between the said posts for rotating the lamp receiving post as the vehicle is steered.

In testimony whereof we affix our signatures.

WILLIAM H. SHANNON. [L. S.]
JOHN H. BOGARD. [L. S.]